(12) United States Patent
Kutsuwada et al.

(10) Patent No.: US 8,755,072 B2
(45) Date of Patent: Jun. 17, 2014

(54) IMAGE FORMING APPARATUS, METHOD OF CONTROLLING IMAGE FORMING APPARATUS, AND PROGRAM FOR CONTROLLING IMAGE FORMING APPARATUS

(75) Inventors: Tetsuro Kutsuwada, Kanagawa (JP); Hiroya Uruta, Tokyo (JP); Akira Masuda, Tokyo (JP); Daisuke Masui, Kanagawa (JP); Takayuki Inoue, Kanagawa (JP); Hiroaki Kobayashi, Tokyo (JP); Hajime Kubota, Kanagawa (JP); Yusuke Kawatsu, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 71 days.

(21) Appl. No.: 13/352,727

(22) Filed: Jan. 18, 2012

(65) Prior Publication Data
US 2012/0188601 A1 Jul. 26, 2012

(30) Foreign Application Priority Data

Jan. 26, 2011 (JP) ................................ 2011-014223

(51) Int. Cl.
*G06F 3/12* (2006.01)
*G06K 15/02* (2006.01)
*G06K 15/00* (2006.01)
*B41J 11/44* (2006.01)

(52) U.S. Cl.
USPC ............. 358/1.15; 358/1.2; 358/1.14; 400/76

(58) Field of Classification Search
None
See application file for complete search history.

(56) References Cited

U.S. PATENT DOCUMENTS

| 6,773,176 B2* | 8/2004 | Kurosawa ..................... 400/76 |
| 2011/0134442 A1* | 6/2011 | Mori ............................. 358/1.2 |

FOREIGN PATENT DOCUMENTS

| JP | 2000-019906 A | 1/2000 |
| JP | 2002-091743 A | 3/2002 |
| JP | 2003-019830 A | 1/2003 |
| JP | 2011-118285 A | 6/2011 |

* cited by examiner

*Primary Examiner* — Fred Guillermety
*Assistant Examiner* — Henok A Shiferaw
(74) *Attorney, Agent, or Firm* — Harness, Dickey & Pierce, P.L.C.

(57) ABSTRACT

An image forming apparatus stores billing information depending on a formation and output of an image. The apparatus includes a page information acquiring unit that acquires page information written in PDL, a page information analysis unit that analyzes the page information and outputs a drawing command for performing the formation and output of the image for each of a plurality of regions divided from a unit page, a drawing information generating unit that generates drawing information for performing the formation and output of the image on the basis of the drawing command, a billing amount determining unit that judges whether an image to be drawn is contained in each of the divided regions and determines a billing amount for each divided region on the basis of the judgment result, and a billing information storage unit that stores information of the determined billing amount.

13 Claims, 8 Drawing Sheets

FIRST BAND

SECOND BAND

THIRD BAND

FOURTH BAND

FIFTH BAND

| PAPER SIZE | COLOR | MONOCHROME | |
|---|---|---|---|
| A4 | 40 yen | 10 yen | ... |
| A3 | 60 yen | 15 yen | |
| ⋮ | | | |

| PAPER SIZE | CHARGE | |
|---|---|---|
| A4 | 10 yen | ... |
| A3 | 15 yen | |
| ⋮ | | |

IMAGE FORMING APPARATUS, METHOD OF CONTROLLING IMAGE FORMING APPARATUS, AND PROGRAM FOR CONTROLLING IMAGE FORMING APPARATUS

CROSS-REFERENCE TO RELATED APPLICATIONS

The present application claims priority to and incorporates by reference the entire contents of Japanese Patent Application No. 2011-014223 filed in Japan on Jan. 26, 2011.

BACKGROUND OF THE INVENTION

1. Field of the Invention

An embodiment of the invention relates to an image forming apparatus, a method of controlling an image forming apparatus, and a program for controlling an image forming apparatus. Particularly, the relates to a billing control for an image forming apparatus.

2. Description of the Related Art

In recent years, information tends to be computerized, and image processing apparatuses, such as printers or facsimiles used to output computerized information and scanners used to computerize documents, have become inevitable. In many cases, the image processing apparatus has, for example, an imaging function, an image forming function, and a communication function and is configured as a multifunction peripheral (MFP) capable of being used as a printer, a facsimile, a scanner, and a copying machine.

Among the image processing apparatuses, the printer that is used to output computerized information may provide a usage-based billing service that billing amounts for the number of pages which are printed out. In the usage-based billing service, the following methods have been proposed: a method of calculating the percentage of a color print region and determining a billing amount on the basis of the percentage (for example, see Japanese Patent Application Laid-open No. 2002-91743); and a method of calculating and estimating the amount of toner used and determining a billing amount on the basis of the estimation result (for example, Japanese Patent Application Laid-open No. 2000-19906).

Both the methods disclosed in Japanese Patent Application Laid-open No. 2002-91743 and Japanese Patent Application Laid-open No. 2000-19906 involve, for example, the calculation of the print region or the calculation of the amount of toner used. The calculation process needs to be performed on the basis of the print job after the print job is input to the printer. Therefore, the printer needs to ensure resources also for the calculation process. As a result, the resource for performing the image processing is occupied and the throughput of an image forming/outputting process is reduced. In addition, since it is difficult to accurately calculate the print region or the amount of toner used as described above, the reliability of a billing amount determined on the basis of the calculation result is not sufficiently high.

SUMMARY OF THE INVENTION

It is an object of the present invention to at least partially solve the problems in the conventional technology.

An image forming apparatus stores billing information depending on a formation and output of an image. The apparatus includes a page information acquiring unit that acquires page information written in a page description language, a page information analysis unit that analyzes the acquired page information and outputs a drawing command for performing the formation and output of the image for each of a plurality of regions divided from a unit page, a drawing information generating unit that generates drawing information for performing the formation and output of the image on the basis of the drawing command, a billing amount determining unit that judges whether an image to be drawn is contained in each of the divided regions and determines a billing amount for each divided region on the basis of the judgment result, and a billing information storage unit that stores information of the determined billing amount.

A control program product includes a non-transitory computer-readable medium having computer-readable program codes embedded therein for controlling an image forming apparatus that stores billing information depending on a formation and output of an image. The program codes when executed causing a computer to execute acquiring page information written in a page description language, analyzing the acquired page information and outputting a drawing command to perform the formation and output of the image for each of a plurality of regions divided from a unit page, generating drawing information for performing the formation and output of the image on the basis of the drawing command, judging whether an image to be drawn is contained in each of the divided regions and determining a billing amount for each divided region on the basis of the judgment result, and storing information of the determined billing amount.

A method of controlling an image forming apparatus that stores billing information depending on a formation and output of an image. The method includes acquiring page information written in a page description language and storing the page information into a storage medium, analyzing the acquired page information and outputting a drawing command to perform the formation and output of the image for each of a plurality of regions divided from a unit page, generating drawing information for performing the formation and output of the image on the basis of the drawing command, and storing the drawing information into a storage medium, judging whether an image to be drawn is contained in each of the divided regions and determining a billing amount for each divided region on the basis of the judgment result, and storing information of the determined billing amount into a storage medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Hereinafter, an exemplary embodiment of the invention will be described in detail with reference to the accompanying drawings. In the present embodiment, the explanation will be made as an example on an image forming system in which a billing amount is determined at an image forming apparatus where an image forming and outputting is performed, and the information of billing amount is collected at a server of a service provider.

Figure 1:
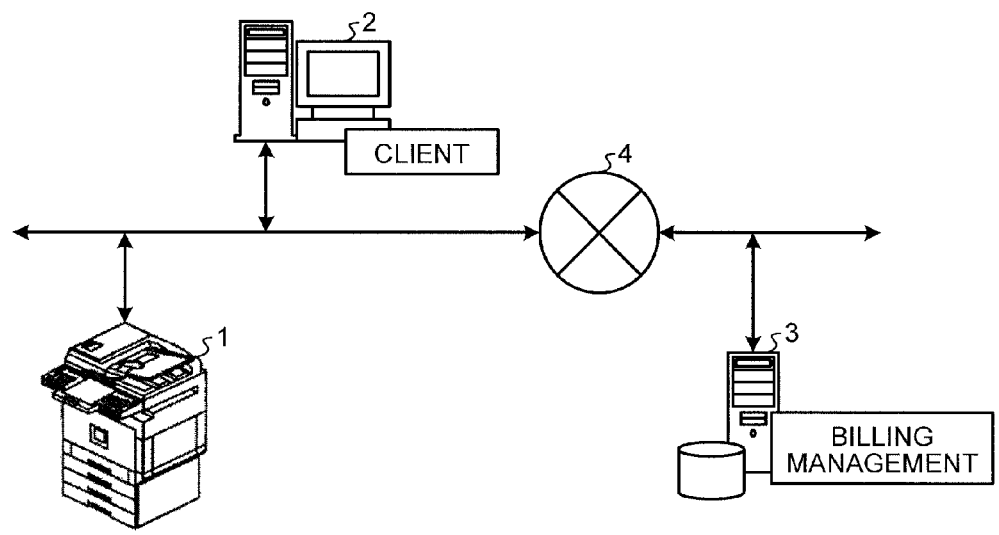
FIG. 1 is a diagram illustrating the operation form of a system according to an embodiment.

FIG. 1 is a diagram illustrating an exemplary operational configuration of the system according to the present embodiment. As illustrated in FIG. 1, the system according to the embodiment is configured from a service user network to which an image forming apparatus 1 and a client terminal 2 are connected, and a service provider network to which a billing management server 3 is connected. These networks are connected by a public line 4 such as the Internet or a telephone line.

The image forming apparatus 1 is a multi-function peripheral (MFP) equipped with an imaging function, an image forming function, and a communication function and the like, so that it can be used as a printer, a facsimile, a scanner, and a copy machine. In the present embodiment, the image forming apparatus 1 forms and outputs an image on the basis of a print job received from the client terminal 2. The image forming apparatus 1 also calculates a billing amount in the course of the image processing based on the print job, and sends the calculated billing amount to the billing management server 3.

The client terminal 2 is an information processing terminal operated by the user and is embodied as an information processing apparatus such as a personal computer (PC). The billing management server 3 is operated by the service provider and collects the billing amount calculated by the image forming apparatus 1.

Next, an explanation will be made on the hardware configuration of the image forming apparatus 1, the client terminal 2, and the billing management server 3 according to the present embodiment with reference to FIG. 2. Incidentally, the image forming apparatus 1 is provided with an engine for implementing a scanner, a printer and the like, in addition to the hardware configuration illustrated in FIG. 2. The following explanation is focused on the hardware configuration of the image forming apparatus 1 as an example, but the same explanation can be applied to the client terminal 2 and the billing management server 3.

Figure 2:
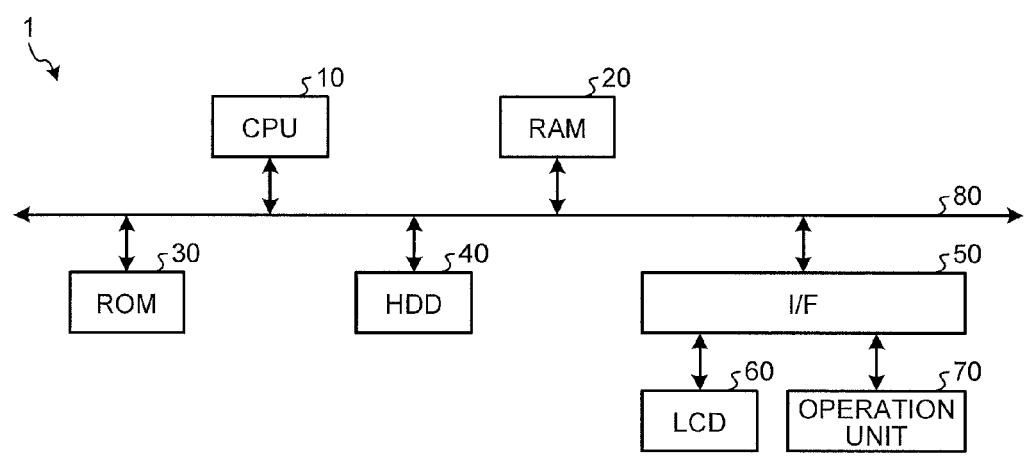
FIG. 2 is a block diagram schematically illustrating the hardware configuration of an image forming apparatus according to the embodiment.

As illustrated in FIG. 2, the image forming apparatus 1 according to the present embodiment has the same structure as a general server, a PC and the like. That is, the image forming apparatus 1 according to the present embodiment includes a central processing unit (CPU) 10, a random access memory (RAM) 20, a read only memory (ROM) 30, a hard disk drive (HDD) 40, and an I/F 50 which are connected to each other through a bus 80. In addition, a liquid crystal display (LCD) 60 and an operation unit 70 are connected to the I/F 50.

The CPU 10 is an arithmetic unit to control the overall operation of the image forming apparatus 1. The RAM 20 is a volatile storage medium that can read and write information at a high speed and is used as a work area when the CPU 10 processes information. The ROM 30 is a non-volatile read only memory and stores a program, such as firmware. The HDD 40 is a non-volatile storage medium that can read and write information and stores, for example, an operating system (OS), various kinds of control programs, and application programs.

The I/F 50 connects the bus 80 and various kinds of hardware components or networks, and controls them. The LCD 60 is a visual user interface for the user to check the state of the image forming apparatus 1. The operation unit 70 is a user interface such as a keyboard or a mouse for the user to input information to the image forming apparatus 1. Incidentally, as explained with reference to FIG. 1, the billing management server 3 according to the present embodiment is operated as a server. Therefore, the user interfaces such as the LCD 60 and the operation unit 70 can be omitted for the server 3.

In this hardware configuration, the program stored in the ROM 30, the HDD 40, or a storage medium (not illustrated), such as an optical disk, is read to the RAM 20 and is operated under the control of the CPU 10, thereby forming a software control unit. The software control unit formed in this way is combined with hardware to form a functional block that implements the functions of the image forming apparatus 1, the client terminal 2, and the billing management server 3 according to the present embodiment.

Figure 3:
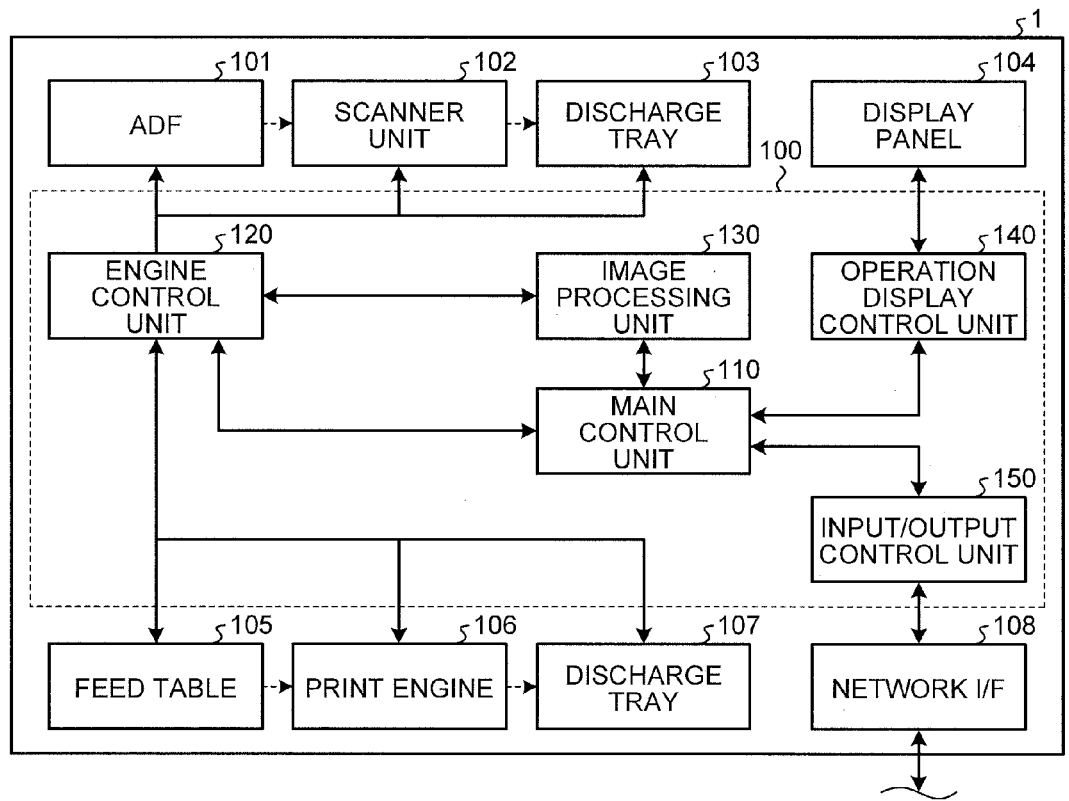
FIG. 3 is a block diagram illustrating the functional structure of the image forming apparatus according to the embodiment.

Next, the functional structure of the image forming apparatus 1 according to the present embodiment will be described with reference to FIG. 3. FIG. 3 is a block diagram illustrating the functional structure of the image forming apparatus 1 according to the present embodiment. As illustrated in FIG. 3, the image forming apparatus 1 according to the present embodiment includes a controller 100, an auto document feeder (ADF) 101, a scanner unit 102, a discharge tray 103, a display panel 104, a feed table 105, a print engine 106, a discharge tray 107, and a network I/F 108.

The controller 100 includes a main control unit 110, an engine control unit 120, an image processing unit 130, an operation display control unit 140, and an input/output control unit 150. As illustrated in FIG. 3, the image forming apparatus 1 according to the present embodiment is a multi-function peripheral equipped with the scanner unit 102 and the print engine 106. In FIG. 3, electrical connection is represented by a solid arrow and the flow of sheets or a bundle of documents is represented by a dashed arrow.

The display panel 104 is an output interface that visually displays the state of the image forming apparatus 1 and is also an input interface serving as a touch panel for the user to directly operate the image forming apparatus 1 or input information to the image forming apparatus 1. That is, the display panel 104 has a function of displaying an image for receiving an operation by the user. The display panel 104 is embodied by the LCD 60 and the operation unit 70 illustrated in FIG. 2. In the present embodiment, the user operates the display panel 104 to instruct the selection and acquisition of the print job stored in the billing management server 3.

The network I/F 108 is an interface for the image forming apparatus 1 to communicate through the network with another apparatus such as the client terminal 2 or the billing management server 3. Ethernet (registered trademark) or universal serial bus (USB) interface may be used for the network I/F 108. The network I/F 108 is embodied by the I/F 50 illustrated in FIG. 2.

The controller 100 is configured as a combination of software and hardware. Specifically, the controller 100 is configured from the hardware such as integrated circuit with a software control unit implemented as follows. That is, a program is read from a non-volatile storage medium such as optical disc and HDD 40, or non-volatile memory, ROM and the like. The read program is loaded to a volatile memory such as RAM 20 (hereinafter simply called as "memory"). The CPU 10 is operated in accordance with the program. Thus, the software control unit is configured. The controller 100 functions as a control unit that controls the overall operation of the image forming apparatus 1.

The main control unit 110 controls respective units in the controller 100 and gives commands to respective units of the controller 100. The engine control unit 120 functions as a driving unit that controls or drives, for example, the print engine 106 or the scanner unit 102. The image processing unit 130 generates drawing information on the basis of image information to be printed out, under the control of the main control unit 110. The drawing information is for drawing the image to be formed by the print engine 106, which is an image forming unit, in an image forming operation.

The image processing unit 130 according to the present embodiment generates the drawing information for each band. The band means a region or unit obtained by dividing one page into a plurality of pieces. The image processing unit 130 determines for each band whether an object to be depicted exists, and determines the billing amount in the course of generating the drawing information. This will be described in detail below.

The image processing unit 130 processes imaging data which is input from the scanner unit 102 to generate image data. The image data is information which is stored as the result of a scanner operation in a storage area of the image forming apparatus 1 or is transmitted to the billing management server 3 through the network I/F 108.

The operation display control unit 140 displays information on the display panel 104 or notifies information input through the display panel 104 to the main control unit 110. The input/output control unit 150 inputs information input through the network I/F 108 to the main control unit 110. The main control unit 110 controls the input/output control unit 150 and accesses another apparatus, such as the client terminal 2 or the billing management server 3, through the network I/F 108 and the network.

Figure 4:
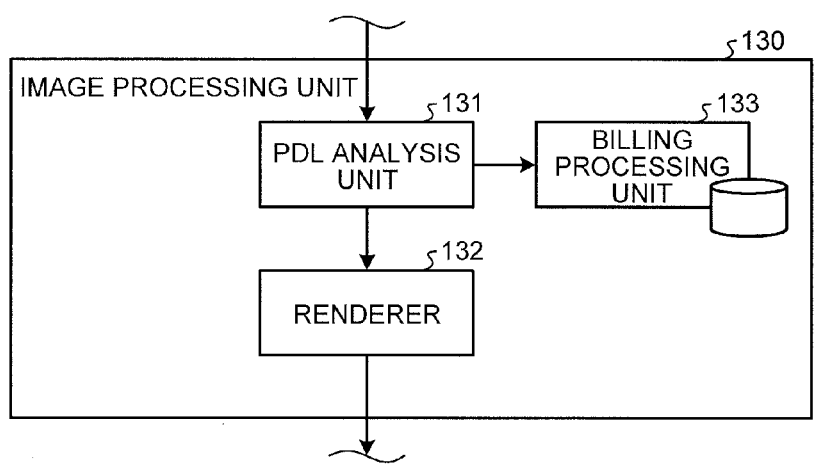
FIG. 4 is a block diagram illustrating the functional structure of the image forming apparatus according to the embodiment.

FIG. 4 is a block diagram illustrating the detailed structure of the image processing unit 130 according to the present embodiment. As illustrated in FIG. 4, the image processing unit 130 according to the present embodiment includes a page description language (PDL) analysis unit 131, a renderer 132, and a billing processing unit 133. The PDL analysis unit 131 analyzes PDL information which is input as a print job and generates a display list, which is information in which an object in the page to be output is described. That is, the PDL analysis unit 131 functions as a page information analysis unit and a drawing information generating unit. In addition, the PDL analysis unit 131 calculates a billing amount in the display list generating process. That is, in the present embodiment, the PDL analysis unit 131 functions as a billing amount determining unit.

The renderer 132 performs rendering on the basis of the generated display list, thereby generating bitmap information used by the print engine 106 to form and output an image. The bitmap information is the above-mentioned drawing information. The bitmap information generated by the renderer 132 is stored in a memory in the engine control unit 120.

As described above, the image processing unit 130 according to the present embodiment generates the drawing information for each band. Therefore, the PDL analysis unit 131 generates the display list for each band, that is, the display list for each of the plurality of regions divided from one page, and the renderer 132 generates the bitmap information on the basis of the display list for each band.

The billing processing unit 133 acquires the billing amount calculated by the PDL analysis unit 131 and stores the billing amount as the billing information. That is, the billing processing unit 133 functions as a billing information storage unit. The billing processing unit 133 outputs the stored billing information under the control of the main control unit 110. The input/output control unit 150 transmits the output billing information to the billing management server 3 through the network under the control of the main control unit 110.

When the image forming apparatus 1 operates as a printer, the input/output control unit 150 firstly receives a print job through the network I/F 108. That is, the input/output control unit 150 functions as a command acquiring unit and a command receiving unit. The input/output control unit 150 transmits the received print job to the main control unit 110. When receiving the print job, the main control unit 110 controls the image processing unit 130 to generate the drawing information on the basis of document information or image information contained in the print job.

When the image processing unit 130 generates the drawing information, the engine control unit 120 controls the print engine 106 to form an image on the sheet conveyed from the feed table 105 on the basis of the generated drawing information. That is, the image processing unit 130, the engine control unit 120, and the print engine 106 function as an image forming/output unit. Specifically, for example, an ink-jet image forming mechanism or an electrophotographic image forming mechanism may be used as the print engine 106. The document on which the image is formed by the print engine 106 is discharged to the discharge tray 107.

Figure 5:
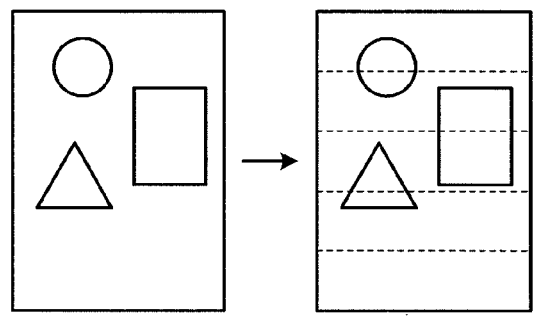
FIG. 5 is a diagram illustrating an example of band division according to the embodiment.
Figure 6:
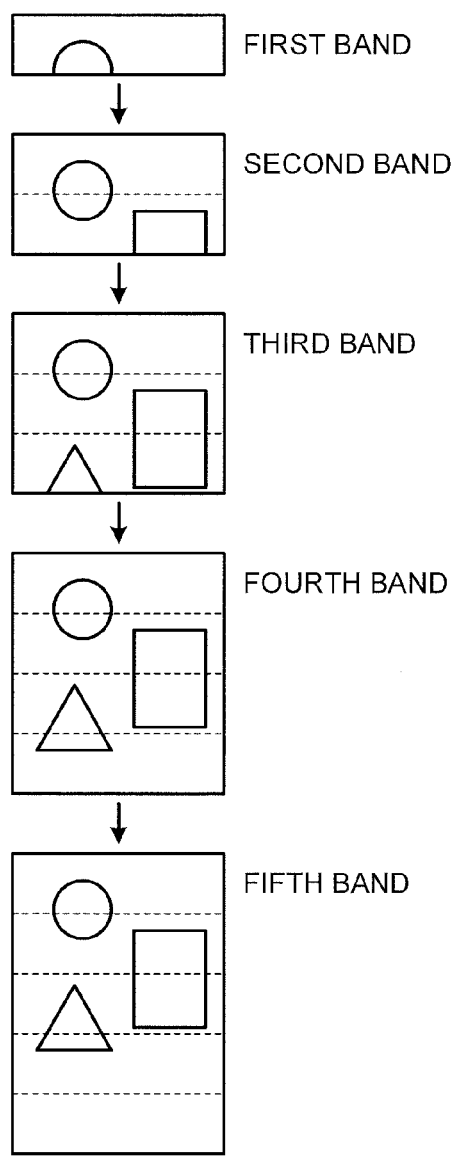
FIG. 6 is a diagram illustrating an exemplary way of generating drawing information from regionally divided information according to the embodiment.

FIGS. 5 and 6 are diagrams schematically illustrating the concept of rendering for each band according to the present embodiment. When images in a page illustrated on the left side of FIG. 5 is formed and outputted, the page is divided into regions, as illustrated by dashed lines on the right side of FIG. 5. The divided each region is processed as a band. As described above, the PDL information, which is a print job, includes information for describing the image illustrated on the left side of FIG. 5. The PDL analysis unit 131 performs band division as illustrated on the right side of FIG. 5, on the basis of a set value that defines a range of each region, and thereby generates the display list for each band.

When the renderer 132 performs a rendering on the basis of the display list for which the page is divided into bands as illustrated on the right side of the FIG. 5, the drawing information is generated respectively for each of the first to fifth bands, as illustrated in FIG. 6. The drawing information which is generated for each band as illustrated in FIG. 6 is stored in a band memory in the engine control unit 120. The band memory in the engine control unit 120 means a memory region in the RAM 20 secured by the engine control unit 120 configured as the software control unit, and does not mean an actual device physically or actually mounted inside the engine control unit 120.

When the drawing information for each band is stored in the band memory, the engine control unit 120 sequentially inputs the stored drawing information for each band to the print engine 106. Thereby, the print engine 106 performs an image forming/output process on the sheet. This process enables the image processing unit 130 to start the formation and output of an image at the time when the drawing information corresponding to one band is generated, without waiting for the generation of the drawing information corresponding to one page.

Figure 7:
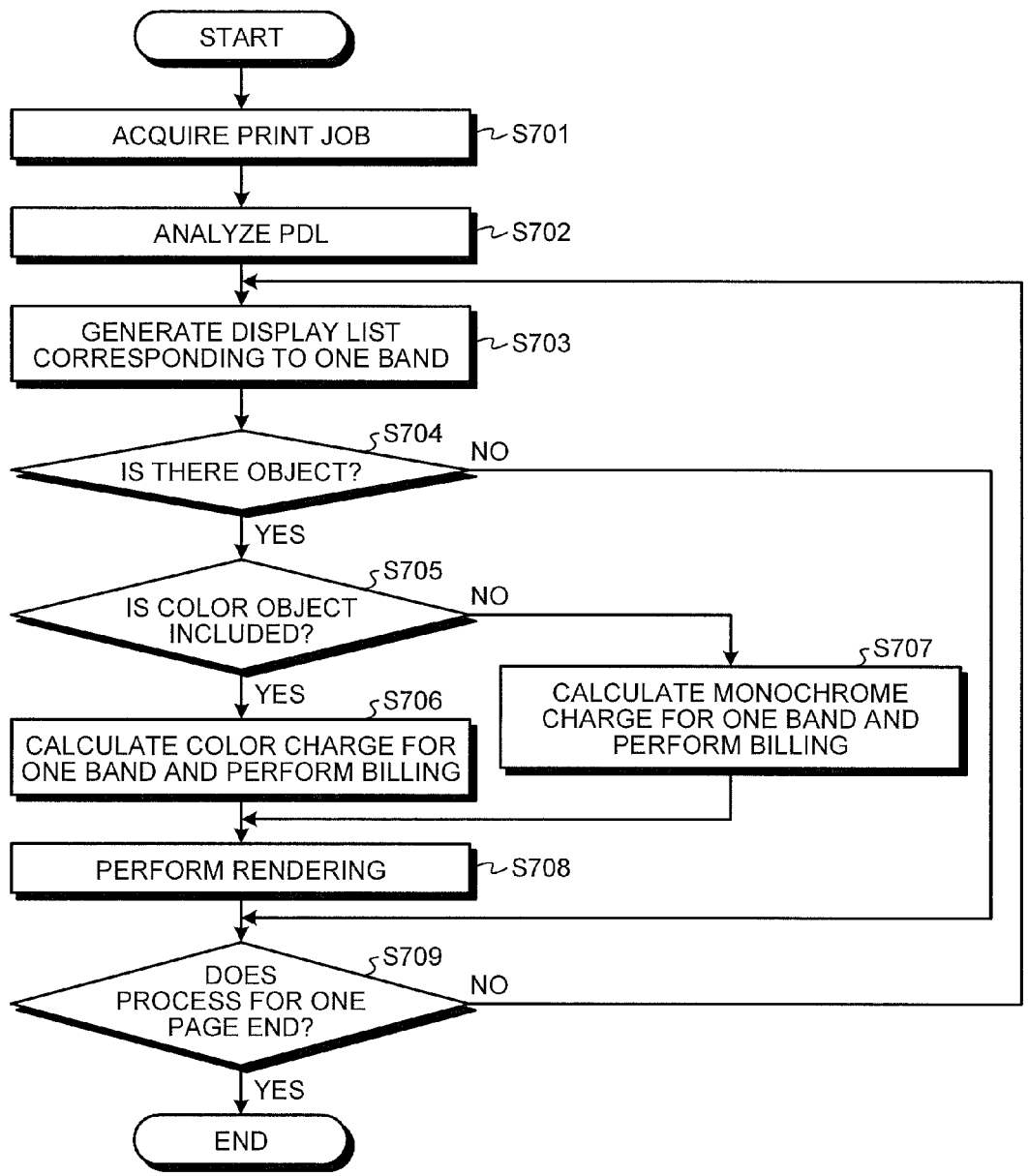
FIG. 7 is a flowchart illustrating an operation of an image processing unit according to the embodiment.

In the image forming apparatus 1 having the above-mentioned structure, the point of the present embodiment is that the PDL analysis unit 131 determines a billing amount for each band with analyzing PDL. Next, the operation of the image processing unit 130 according to the present embodiment will be described with reference to FIG. 7. FIG. 7 is a flowchart illustrating the operation of the image processing unit 130 according to the present embodiment.

When the image forming apparatus 1 receives a print job from the client terminal 2, the PDL analysis unit 131 of the image processing unit 130 acquires the print job from the main control unit 110 in Step S701, as illustrated in FIG. 7. When acquiring the print job, the PDL analysis unit 131 performs PDL analysis in Step S702 and generates a display list for which an object or objects are described in a range corresponding to predetermined one band in Step S703.

The set information for the range corresponding to one band may be stored in the PDL analysis unit 131, for example. The PDL analysis unit 131 stores information indicating the range corresponding to one band for the band division, for each paper size or each direction of the sheet to be subjected to the image forming/output process. As illustrated in FIGS. 5 and 6, in the band division, one page is divided into a plurality of bands in the sub-scanning direction. Therefore, the range corresponding to one band is determined by a width in the sub-scanning direction. Incidentally, the range corresponding to one band is set in the print job. The PDL analysis unit 131 may use the information of the range corresponding to one band which is set in the print job.

When the display list for one band is generated in Step S703, the PDL analysis unit 131 determines or judges whether any object exists in the band, that is, whether the band is not empty in step S704. The display list contains information for describing the object contained in the band. Therefore, it is determined that the band is empty for which any information for describing the object is not contained in the display list. This determination can be achieved with low processing load.

When it is determined in Step S704 that the object is contained (YES in Step S704), the PDL analysis unit 131 determines or judges whether the contained object is a color object in Step S705. Incidentally, if a plurality of objects is contained in one band and at least one object is a color object, the PDL analysis unit 131 determines or judges that the contained objects are color objects in Step S705.

When it is determined in Step S705 that the contained object is a color object (YES in Step S705), the PDL analysis unit 131 calculates a color price for one band and inputs the color price as a billing amount to the billing processing unit 133, thereby performing a billing process in Step S706. In this way, the billing information is stored in the billing processing unit 133.

On the other hand, when it is determined in Step S705 that the contained object is a monochromatic object (NO in Step S705), the PDL analysis unit 131 calculates a monochrome price for one band and inputs the monochrome price as a billing amount to the billing processing unit 133, thereby performing a billing process in Step S707. In this way, the billing information is stored in the billing processing unit 133.

Figures 8, 9:
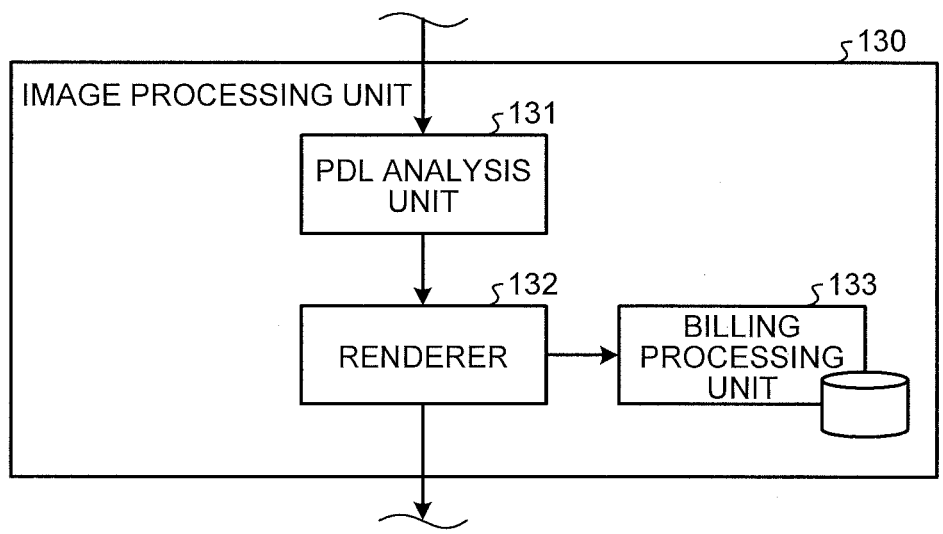
FIG. 8 is a diagram illustrating an example of page-basis unit price information according to the embodiment.
FIG. 9 is a block diagram illustrating the functional structure of an image processing unit according to another embodiment.

FIG. 8 shows an example of page-basis price information (billing amount information) stored in the PDL analysis unit 131. This price information is hereinafter referred to the page-basis unit price information. As illustrated in FIG. 8, in the page-basis unit price information according to the present embodiment, both color price and monochrome price of one page are respectively set depending on paper sizes. That is, as illustrated in FIG. 8, according to the present embodiment, the PDL analysis unit 131 determines the billing amount on the basis of whether the print mode is color or monochrome. The billing amount for one band is obtained from the following equitation (1), on the basis of the page-basis price set in the information as illustrated in FIG. 8 and on the basis of the width of one band in the sub scanning direction.

Billing amount for one band=(Width of one band in the sub scanning direction/Width of one page in the sub scanning direction)×Price for one page (1)

When band division is performed such that all the bands have the same width as illustrated in FIG. 5, that is, when the value obtained by dividing "the width of one page in the sub-scanning direction" by "the width of one band in the sub-scanning direction" is equal to the "band division number", the equitation (1) is equal to the following equitation (2).

Billing amount for one band=Price for one page/Band division number (2)

A billing amount for each of the bands forming one page is calculated by Expression 1 or Expression 2 and is totalized to calculate a billing amount for one page. In the example illustrated in FIG. 5, since no object is contained in the fifth band, there is no billing amount for the fifth band. As a result, a billing amount for one page in which the image illustrated in FIG. 5 is formed is four-fifths of the page-basis prices illustrated in FIG. 8.

Incidentally, the width of one page in the sub-scanning direction or the width of one band in the sub-scanning direction may be defined as value in centimeters (cm) or inches indicating an actual length. Alternatively, they may be defined as values in a unit unique to the PDL analysis unit 131.

Then, the renderer 132 performs a rendering on the basis of the display list generated by the PDL analysis unit 131 in Step S708 and generates bitmap data corresponding to one band. The image processing unit 130 repeatedly performs Steps S703 to S708 on all the bands contained in one page until the process is completed (NO in Step S709). When the steps for all the bands contained in one page are completed (YES in Step S709), the process ends.

As described above, in the image forming apparatus 1 according to the present embodiment, when the display list is generated for each band in the analysis of PDL, it is determined whether any object is contained in each band and it is determined whether any billing amount is arisen for each band. Therefore, usage-based billing can be achieved without involving a difficult process.

Second Embodiment

In the first embodiment, in the stage that the PDL analysis unit 131 performs PDL analysis, it is determined only whether any object exists in each band. However, in the present embodiment, an example capable of performing detailed determination will be described. The same or similar components as those in the first embodiment are denoted by the same reference numerals and a detailed description thereof will not be repeated.

An image forming system and an image forming apparatus 1 according to the present embodiment have substantially the same structure as those in the first embodiment. The structure and function of an image processing unit 130 according to the present embodiment is different from those of the image processing unit according to the first embodiment. FIG. 9 is a block diagram illustrating the functional structure of the image processing unit 130 according to the present embodiment. As illustrated in FIG. 9, a billing processing unit 133 of the image processing unit 130 according to the present embodiment acquires a billing amount output from a renderer 132 and stores billing information.

The renderer 132 according to the present embodiment has a function of determining whether a pixel is a colored pixel or a colorless pixel with reference to the data of each pixel forming bitmap data which is generated by rendering when the bitmap data is output, in addition to the rendering function described in the first embodiment. The number of colored pixels in each band is counted. When the counting result is less than a predetermined threshold value, it is determined that no object is contained in the band and determined that the band is not charged.

In general, when outputting the bitmap data, the renderer 132 outputs the bitmap data as CMYK (cyan, magenta, yellow, and black) data corresponding to toner or ink when a print engine 106 forms and outputs an image. In the present embodiment, the renderer 132 determines or judges whether there is a charging target based on the CMYK data. Therefore, the detailed usage-based billing can be achieved with a simple structure. That is, in the present embodiment, the renderer 132 functions as a billing amount determining unit.

Figures 10, 11:
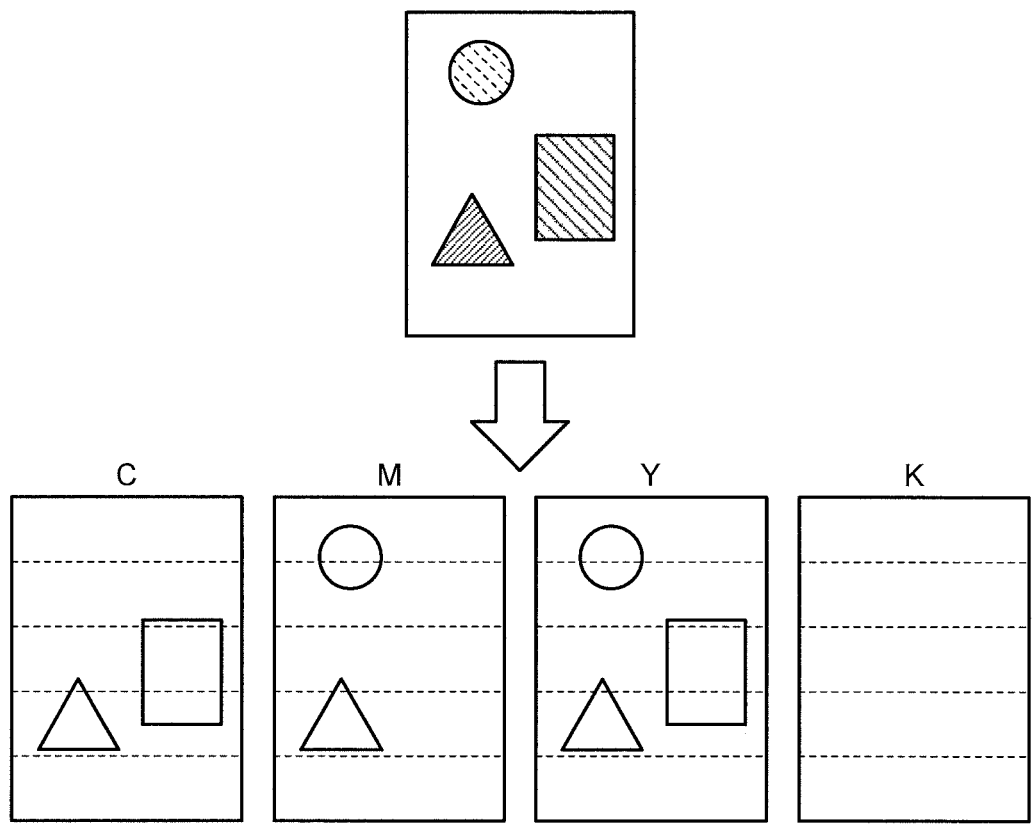
FIG. 10 is a diagram illustrating an example of color-basis band division according to another embodiment.
FIG. 11 is a diagram illustrating an example of page-basis unit price information according to another embodiment.

Next, the main point of the present embodiment will be further described with reference to FIG. 10. When a color image illustrated in FIG. 10 is output, a general printer mixes CMYK inks to reproduce a full color. Therefore, in general rendering, an image to be output is converted into a CMYK format and CMYK bitmap data is generated, as illustrated in FIG. 10. Then, the print engine 106 inputs bitmap data of each color to plotters corresponding to each color and the plotters output images. In this way, a full color image is formed and output.

As illustrated in FIG. 10, in some cases, a color is represented by only some of C, M, Y, and K, without using all of C, M, Y, and K, depending on the color of the image to be formed and output. For example, in the example illustrated in FIG. 10, the color of a circular object is represented by magenta and yellow, the color of a triangular object is represented by cyan, magenta, and yellow, and the color of a rectangular object is represented by cyan and yellow. In this case, the method of determining a billing amount based on only whether the color is a full color as in the first embodiment is not accurate as a usage-based billing method for determining a billing amount based on the amount of toner used.

Here, if it is focused the central band (i.e. the third band from the top) of magenta image illustrated in FIG. 10, only a top portion of the triangular object is slightly contained. In this case, it is also inaccurate that the band is determined as the billing target because of containing only the part of the object, as for the usage-based billing method for determining a billing amount on the basis of the amount of toner used.

According to the present embodiment, the renderer 132 determines about the billing amount on the basis of respective CMYK data which is output by the renderer 132 after performing the rendering. Thereby, the above problems can be solved. That is, according to the present embodiment, the renderer 132 determines the billing amount on the basis of the number of colors required to draw the object. Therefore, as illustrated in FIG. 11, the renderer 132 according to the present embodiment stores the unit price information in which a billing amount for one page and one color is determined for each paper size and totalizes a billing amount for each color to calculate a billing amount for a full color.

Figure 12:
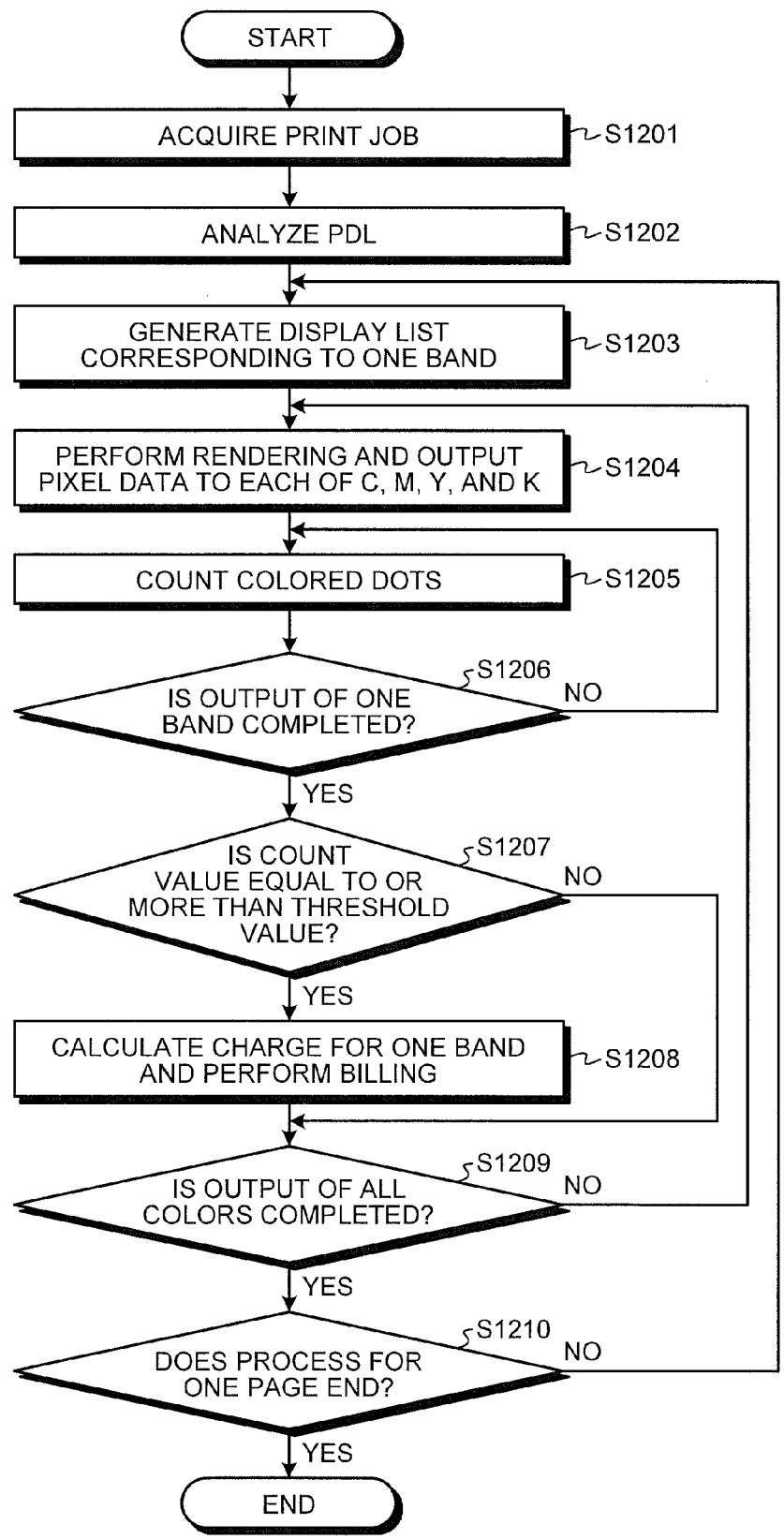
FIG. 12 is a flowchart illustrating an operation of an image processing unit according to another embodiment.

FIG. 12 is a flowchart illustrating the operation of the image processing unit 130 according to the present embodiment. When the image forming apparatus 1 receives a print job from the client terminal 2, the PDL analysis unit 131 of the image processing unit 130 acquires the print job from the main control unit 110 in Step S1201, as illustrated in FIG. 12. When acquiring the print job, the PDL analysis unit 131 performs PDL analysis in Step S1202 and generates a display list in which an object contained in the set range corresponding to one band is described in Step S1203.

When the PDL analysis unit 131 generates the display list, the renderer 132 performs the rendering to generate bitmap data and starts to output pixel data for each of C, M, Y, and K to the engine control unit 120 in Step S1204. When the output of the pixel data starts, the renderer 132 counts the number of colored dots with reference to whether the pixel data to be output is colored or colorless in Step S1205.

The renderer 132 continues to count the number of colored dots in accordance with the output of pixel data generated on the basis of the display list corresponding to one band (NO in Step S1206). When the counting of the pixel data corresponding to one band is completed (YES in Step S1206), the renderer 132 compares the count value with a predetermined threshold value in Step S1207. The threshold value may be, for example, 5% or 10% of the number of pixels in one band.

As a result of the comparison, when the count value is equal to or more than the threshold value (YES in Step S1207), the renderer 132 determines or judges that an object is contained in the band, calculates a billing amount for one band and one color on the basis of the unit price information illustrated in FIG. 11, and inputs the billing amount to the billing processing unit 133, thereby performing a billing process in Step S1208. In this way, billing information is stored in the billing processing unit 133.

When Step S1208 ends, the renderer 132 determines or judges whether the process from Step S1204 for all of C, M, Y, and K is completed in Step S1209. When the count value is less than the threshold value in Step S1207 (NO in Step S1207), the process proceeds to Step S1209, without performing the billing process. When the process for all colors is not completed, the renderer 132 repeatedly performs the process from Step S1204 (NO in Step S1209). When the process for all colors is completed (YES in Step S1209), the renderer 132 determines or judges whether the process from Step S1203 is completed for one page in Step S1210.

When the process for one page is not completed (NO in Step S1210), the renderer 132 repeatedly performs the process from Step S1203 on the second band, the third band, and so on. When the process for one page is completed (YES in Step S1210), the renderer 132 ends the process.

As such, according to the present embodiment, the renderer 132 performs the rendering and then determines or judges whether the billing amount is arisen for each of the C, M, Y, and K data items. Therefore, when a full color image is formed and output, the detailed usage-based billing can be achieved on the basis of the amount of toner or ink used.

The number of colored dots in each band is counted. When the counting result is not more than a predetermined threshold value, it is determined that there is no object in the band and the band is not charged. This process does not require a complicated process and is achieved by: a memory capable of counting the number of pixels contained in one band; and a module that determines or judges whether each pixel is colored or colorless, that is, a module capable of judging one bit. Therefore, this process can be achieved with a simple structure. As a result, it can be avoided by the simple configuration a state that the band containing only a part of the object is charged equally with the band containing a big part of the object.

In the first and second embodiments, the explanation has been made as an example on a method of calculating a billing amount for one band on the basis of the ratio of the band width in the sub scanning direction to the page width in the sub-scanning direction, under the assumption that the band width is variable. If the band width changes to lead an change in the band division, the ratio of the numbers of the empty bands changes. As a result, the calculated billing amount may be changed. Thereby, a skilled user may operate the band width to reduce the billing amount, resulting in an unfair charge in comparison with other general users.

In order to solve the problem, it is preferable for the PDL analysis unit 131 to perform the band division with using a band width set as default, i.e. a predetermined divisional width, even in a case that the user's designation of the band width is contained in the print job, when generating the display list for each band. Thus, the above-mentioned unfair charge can be avoided.

In the above-described embodiments, as described with reference to FIGS. 8 and 11, the information of a billing amount for one page for each paper size is stored as a table, considering that the band width is variable, and a billing amount for each band is calculated on the basis of the information. In contrast, as described above, when the band width is fixed, the information of a billing amount for one band in each paper size may be stored as a table. In this way, the processing load of a billing amount determining process can be reduced.

In the above-described embodiments, the explanation has been made on the examples of the band division, in which one page is divided into a plurality of bands in the sub-scanning direction. This is because the purpose of the band division is to start the image forming/outputting process at an early time point, by the print engine 106 that performs finally the image forming/outputting process, after the print job is input to the image forming apparatus 1. That is, it is possible to start the image forming/outputting process, by dividing an image to be formed and output into a plurality of bands in the sub scanning direction, and starting the image forming/outputting process at a time point when the draw information is generated about the top band in the sub scanning direction.

Figure 13A:
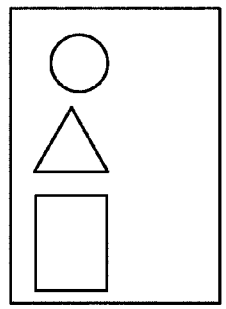
FIGS. 13A to 13C are diagrams illustrating examples of band division according to another embodiment.
Figure 13B:
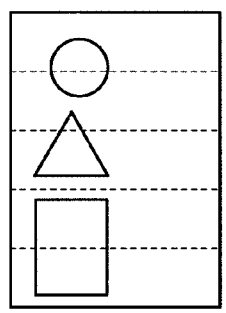
Figure 13C:
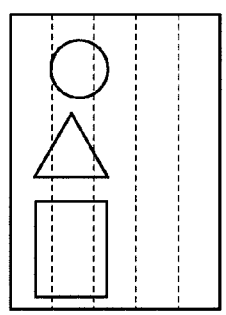

In contrast, for example, in a case that the image illustrated in FIG. 13A is output, all the bands contains objects, if the image is divided into bands as illustrated in FIG. 13B. However, if the image is divided into bands as illustrated in FIG. 13C, there are two empty bands among five bands. Thus, the billing amounts become different among bands.

Relating to this, when performing PDL analysis, the PDL analysis unit 131 preferably determines or judges whether any object exists for each predetermined band width, for both the vertical direction and the horizontal direction of a sheet; generates the display list for the direction in which the number of empty bands is larger; and performs the image forming/outputting process. Thereby, it is possible to achieve the usage-based billing more reflecting therein the amount of toner or ink used.

Figure 14:
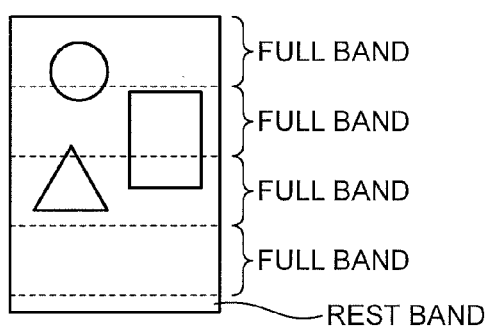
FIG. 14 is a diagram illustrating an example of band division according to another embodiment.

In the above-described embodiments, the explanation has been made as an example on a case that the band width is even in one page, as illustrated in FIG. 5. However, depending on the band width setting, the last band in the sub scanning direction may be narrow, as illustrated in FIG. 14. For example, in a case that one page has 8300 main scanning lines and a band width is set to 2048 lines, there are four full bands each having 2048 lines and one rest band having 108 lines.

Even in this case, the billing amount is calculated depending on the band width, so long as the billing amount for one band is determined depending on the ratio of the band width to the page width in the sub scanning direction. However, in a case of band division illustrated in FIG. 14, the billing amount once calculated for one band needs to be recalculated for the rest band, although the calculated billing amount can be applied to four bands as they are. Relating to this, since the rest band has very narrow width as mentioned above, it may be inefficient to calculate the billing amount for this narrow band.

The PDL analysis unit 131 may avoid such an inefficient calculation process by calculating the ratio of the band width of the rest band to the band width of the full band, comparing the ratio with the predetermined threshold value, and determines that the rest band is not the charge target. The threshold value is a value for determining the band width of the rest band is very narrow. Therefore, the value may be set to 5%, 10% and the like.

In a case that one page has 8300 lines and one band has 2048 lines, the ratio of the band width of the rest band having 108 lines to the band width of the full band having 2048 lines is 5%. Therefore, if the threshold value is set to 10%, the PDL analysis unit 132 or the renderer 133 determines that the rest band is not the charge target, and thereby omits the processing form S704 to S707 in FIG. 7, or the processing from S1205 to S1208 in FIG. 12.

According to the invention, when an image forming/output service is provided at a usage-basis rate or at a metered rate, a billing amount can be determined with a simple structure and high reliability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a page information acquiring unit configured to acquire page information written in a page description language;
    a page information analysis unit configured to analyze the acquired page information and output a drawing command for performing the formation and output of the image for each of a plurality of regions divided from a unit page;
    a drawing information generating unit configured to generate drawing information for performing the formation and output of the image on the basis of the drawing command;
    a billing amount determining unit configured to judge whether an image to be drawn is contained in each of the divided regions and determines a billing amount for each divided region on the basis of the judgment result; and a billing information storage unit configured to store information of the determined billing amount, wherein
the billing amount determining unit stores information indicating a range corresponding to the divided region, for each paper size or each direction of a sheet to be subjected to the formation and output of the image;
wherein the page information analysis unit outputs the drawing command for each of a plurality of regions divided from the unit page in a sub-scanning direction, and the billing amount determining unit assumes two directions perpendicular to each other in the image to be formed and output are the sub-scanning directions, calculates a billing amount for each of the divided regions for both directions, and determines the calculated billing amount in which a sum of the calculated billing amount for unit page is cheaper as the billing amount.

2. The image forming apparatus according to claim 1, wherein the billing amount determining unit calculates and determines the billing amount for each divided region, on the basis of page-basis unit price information in which a billing amount for a unit page is determined for each paper size on which an image is formed and output, information of the width of the unit page, and information of the width of the divided region.

3. The image forming apparatus according to claim 1, wherein the billing amount determining unit determines the billing amount on the basis of the number of colors required to draw the image contained in the divided region.

4. The image forming apparatus according to claim 1, wherein the billing amount determining unit judges whether the image to be drawn is contained in each of the divided regions on the basis of the analysis result of the page information by the page information analysis unit.

5. The image forming apparatus according to claim 1, wherein the billing amount determining unit judges whether the image to be drawn is contained in each of the divided regions on the basis of the drawing information generated by the drawing information generating unit.

6. The image forming apparatus according to claim 5, wherein the billing amount determining unit judges whether the image to be drawn is contained in each of the divided regions on the basis of the number of colored pixels among pixels forming the drawing information generated by the drawing information generating unit.

7. The image forming apparatus according to claim 6, wherein the billing amount determining unit compares the number of colored pixels among the pixels forming the drawing information generated by the drawing information generating unit with a predetermined threshold value, and excludes the divided region in which the number of colored pixels is smaller than the threshold value from a charging target.

8. The image forming apparatus according to claim 6, wherein the drawing information generating unit outputs information of each of the pixels forming the generated drawing information so as to correspond to each color of color developer used in the image forming unit that performs the formation and output of the image, and
the billing amount determining unit judges whether the image to be drawn is contained in each of the divided regions for each color of the color developer, on the basis of the information of the pixel that is output for each color of the color developer.

9. The image forming apparatus according to claim 1, wherein the page information analysis unit outputs the drawing command for each of the plurality of regions divided from the unit page in the sub-scanning direction, specifies the plurality of divided regions on the basis of a predetermined width in the sub-scanning direction, compares the predetermined width in the sub-scanning direction with the width of a remaining region with a width less than the predetermined width in the sub-scanning direction in the unit page, and determines whether to charge for the remaining region on the basis of the comparison result.

10. The image forming apparatus according to claim 1, wherein the page information analysis unit outputs the drawing command for performing the formation and output of the image for each of the divided regions, on the basis of a predetermined width of the divided region.

11. The image forming apparatus according to claim 10, wherein, even in a case that the width of the divided region is designated in the page information, the page information analysis unit outputs the drawing command for performing the formation and output of the image for each of the divided regions, on the basis of the predetermined width of the divided region.

12. A method for performing an image forming apparatus, the image forming apparatus including a page information acquiring unit configured to acquire page information written in a page description language, a page information analysis unit configured to analyze the acquired page information and outputs a drawing command for performing the formation and output of the image for each of a plurality of regions divided from a unit page, a drawing information generating unit configured to generate drawing information for performing the formation and output of the image on the basis of the drawing command, a billing amount determining unit configured to judge whether an image to be drawn is contained in each of the divided regions and determine a billing amount for each divided region on the basis of the judgment result, and a billing information storage unit configured to store information of the determined billing amount, wherein the billing amount determining unit stores information indicating a range corresponding to the divided region, for each paper size or each direction of a sheet to be subjected to the formation and output of the image,
the method comprising:
by the page information acquiring unit, acquiring page information written in the page description language;
by the page information analysis unit, analyzing the acquired page information and outputs a drawing command for performing the formation and output of the image for each of a plurality of regions divided from a unit page;
by the drawing information generating unit, generating drawing information for performing the formation and output of the image on the basis of the drawing command;
by the billing amount determining unit, judging whether an image to be drawn is contained in each of the divided regions and determines the billing amount for each divided region on the basis of the judgment result; and
by the billing information storage unit, storing information of the determined billing amount, wherein
the range of the divided region is determined with information indicating the range corresponding to the divided region, for each paper size or each direction of a sheet to be subjected to the formation and output of the image, the information indicating the range corresponding to the divided region being stored in the billing amount determining unit;
wherein the page information analysis unit outputs the drawing command for each of a plurality of regions divided from the unit page in a sub-scanning direction, and the billing amount determining unit assumes two directions perpendicular to each other in the image to be formed and output are the sub-scanning directions, calculates a billing amount for each of the divided regions for both directions, and determines the calculated billing amount in which a sum of the calculated billing amount for unit page is cheaper as the billing amount.

13. A non-transitory computer readable medium including a computer program product, the computer program product comprising instructions which, when executed by a computer, causes the computer to perform operation of an image forming apparatus, the image forming apparatus including a page information acquiring unit configured to acquire page information written in a page description language, a page information analysis unit configured to analyze the acquired page information and outputs a drawing command for performing the formation and output of the image for each of a plurality of regions divided from a unit page, a drawing information generating unit configured to generate drawing information for performing the formation and output of the image on the basis of the drawing command, a billing amount determining unit configured to judge whether an image to be drawn is contained in each of the divided regions and determine a billing amount for each divided region on the basis of the judgment result, and a billing information storage unit configured to store information of the determined billing amount, wherein the billing amount determining unit stores information indicating a range corresponding to the divided region, for each paper size or each direction of a sheet to be subjected to the formation and output of the image, the operation comprising:

by the page information acquiring unit, acquiring page information written in the page description language;

by the page information analysis unit, analyzing the acquired page information and outputs a drawing command for performing the formation and output of the image for each of a plurality of regions divided from a unit page;

by the drawing information generating unit, generating drawing information for performing the formation and output of the image on the basis of the drawing command;

by the billing amount determining unit, judging whether an image to be drawn is contained in each of the divided regions and determines the billing amount for each divided region on the basis of the judgment result; and by the billing information storage unit, storing information of the determined billing amount, wherein the range of the divided region is determined with information indicating the range corresponding to the divided region, for each paper size or each direction of a sheet to be subjected to the formation and output of the image, the information indicating the range corresponding to the divided region being stored in the billing amount determining unit wherein the page information analysis unit outputs the drawing command for each of a plurality of regions divided from the unit page in a sub-scanning direction, and the billing amount determining unit assumes two directions perpendicular to each other in the image to be formed and output are the sub-scanning directions, calculates a billing amount for each of the divided regions for both directions, and determines the calculated billing amount in which a sum of the calculated billing amount for unit page is cheaper as the billing amount.

* * * * *